United States Patent
Ruybal et al.

(10) Patent No.: US 10,773,708 B2
(45) Date of Patent: Sep. 15, 2020

(54) HYBRID VEHICLE DRIFT CONTROL SYSTEM AND METHOD

(71) Applicant: Ford Global Technologies, LLC, Dearborn, MI (US)

(72) Inventors: Kevin Ray Ruybal, Canton, MI (US); Jose Velazquez Alcantar, Canton, MI (US); Jason Meyer, Canton, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/838,670

(22) Filed: Dec. 12, 2017

(65) Prior Publication Data

US 2019/0176801 A1 Jun. 13, 2019

(51) Int. Cl.
| | |
|---|---|
| *B60W 20/12* | (2016.01) |
| *B60W 30/18* | (2012.01) |
| *B60W 40/109* | (2012.01) |
| *B60L 15/20* | (2006.01) |
| *B60W 50/10* | (2012.01) |
| *B60W 40/114* | (2012.01) |

(52) U.S. Cl.
CPC ......... *B60W 20/12* (2016.01); *B60L 15/2009* (2013.01); *B60W 30/18127* (2013.01); *B60W 50/10* (2013.01); *B60L 2240/22* (2013.01); *B60L 2240/423* (2013.01); *B60W 40/109* (2013.01); *B60W 40/114* (2013.01); *B60W 2710/083* (2013.01)

(58) Field of Classification Search
None
See application file for complete search history.

(56) References Cited

U.S. PATENT DOCUMENTS

| | | |
|---|---|---|
| 5,480,219 A | 1/1996 | Kost et al. |
| 8,437,914 B2 | 5/2013 | Yu et al. |
| 8,521,349 B2 | 8/2013 | Yu et al. |
| 9,296,424 B2 | 3/2016 | Cotgrove |
| 9,399,461 B2 | 7/2016 | Yamazaki et al. |
| 2014/0297120 A1 | 10/2014 | Cotgrove |

FOREIGN PATENT DOCUMENTS

EP  1903260 A1  3/2008

OTHER PUBLICATIONS

Fodor, M., "Methods and System Providing Vehicle Drift," U.S. Appl. No. 15/457,815, filed Mar. 13, 2017, 59 pages.

*Primary Examiner* — Abdhesh K Jha
(74) *Attorney, Agent, or Firm* — David Kelley; McCoy Russell LLP

(57) ABSTRACT

Methods and systems to operate a hybrid vehicle in a controlled lateral vehicle slip mode are described. The lateral vehicle slip mode may adjust torques applied to a vehicle's front wheels and operation of transmission clutches to induce lateral vehicle slip when requested. The vehicle may exit the lateral vehicle slip mode in response to applying vehicle brakes or releasing a vehicle accelerator pedal.

18 Claims, 12 Drawing Sheets

HYBRID VEHICLE DRIFT CONTROL SYSTEM AND METHOD

FIELD

The present description relates generally to methods and systems for controlling vehicle drift while a hybrid vehicle negotiates a turn. The methods and systems may be particularly useful for four wheel drive hybrid vehicles.

BACKGROUND/SUMMARY

A vehicle may purposefully enter vehicle drift where the vehicle's driver intentionally oversteers the vehicle and causes the vehicle's rear wheels to slip. The vehicle may negotiate a turn while the vehicle's driver induces the vehicle in the drift maneuver. It may require a driver with a high degree of skill to enter and maintain a vehicle in a drift maneuver. In particular, the vehicle's driver may have to sharply change a steering wheel position while adjusting powertrain torque to induce and maintain wheel slip while maintaining control of the vehicle along a desired travel path. The vehicle's driver may also have to perform other actions to perform the vehicle drift maneuver or maintain vehicle control. For example, the driver may selectively engage and disengage the vehicle's manual parking brake to increase the vehicle slip angle. Thus, a vehicle driver may need to practice and have considerable agility to skillfully enter a vehicle into a drifting maneuver. However, it may be desirable to allow a vehicle driver to enter a vehicle into vehicle drift conditions with less effort for the purposes of teaching and/or closed course exhibition.

The inventors herein have recognized the above-mentioned issues and have developed a vehicle operating method, comprising: receiving a vehicle drift maneuver request via a controller; and opening one or more clutches of a transmission, providing a propulsive torque to a first front wheel of a vehicle, and providing a regenerative braking torque to a second front wheel via the controller in response to the vehicle drift maneuver request.

By adjusting torques applied to a vehicle's front wheels and opening a transmission clutch, it may be possible to provide the technical result of preparing a vehicle to enter a drifting maneuver. In particular, torque of the vehicle's front wheels may be adjusted so that forces applied to the vehicle bring the vehicle closer to a condition where vehicle yaw (e.g., rotation about the vehicle's yaw axis, an axis that extends in a perpendicular direction through the vehicle's center of mass relative to a longitudinal axis of the vehicle) is induced without actually causing yaw. The transmission's clutches are also opened so that engine torque and electric machine torque may be dumped or quickly transferred to vehicle wheels so as to actually create vehicle yaw when a request to generate vehicle lateral acceleration and/or yaw is generated. In this way, the vehicle may be prepared to enter a drift maneuver without the vehicle's driver having to perform complex and/or precisely timed actions.

The present description may provide several advantages. For example, the approach may provide a way of teaching a driver to operate a vehicle in a drift maneuver. Further, the approach may simplify vehicle operation when operating the vehicle in a drift maneuver. Additionally, the approach may ease the vehicle out of the drift maneuver so as to improve vehicle drivability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
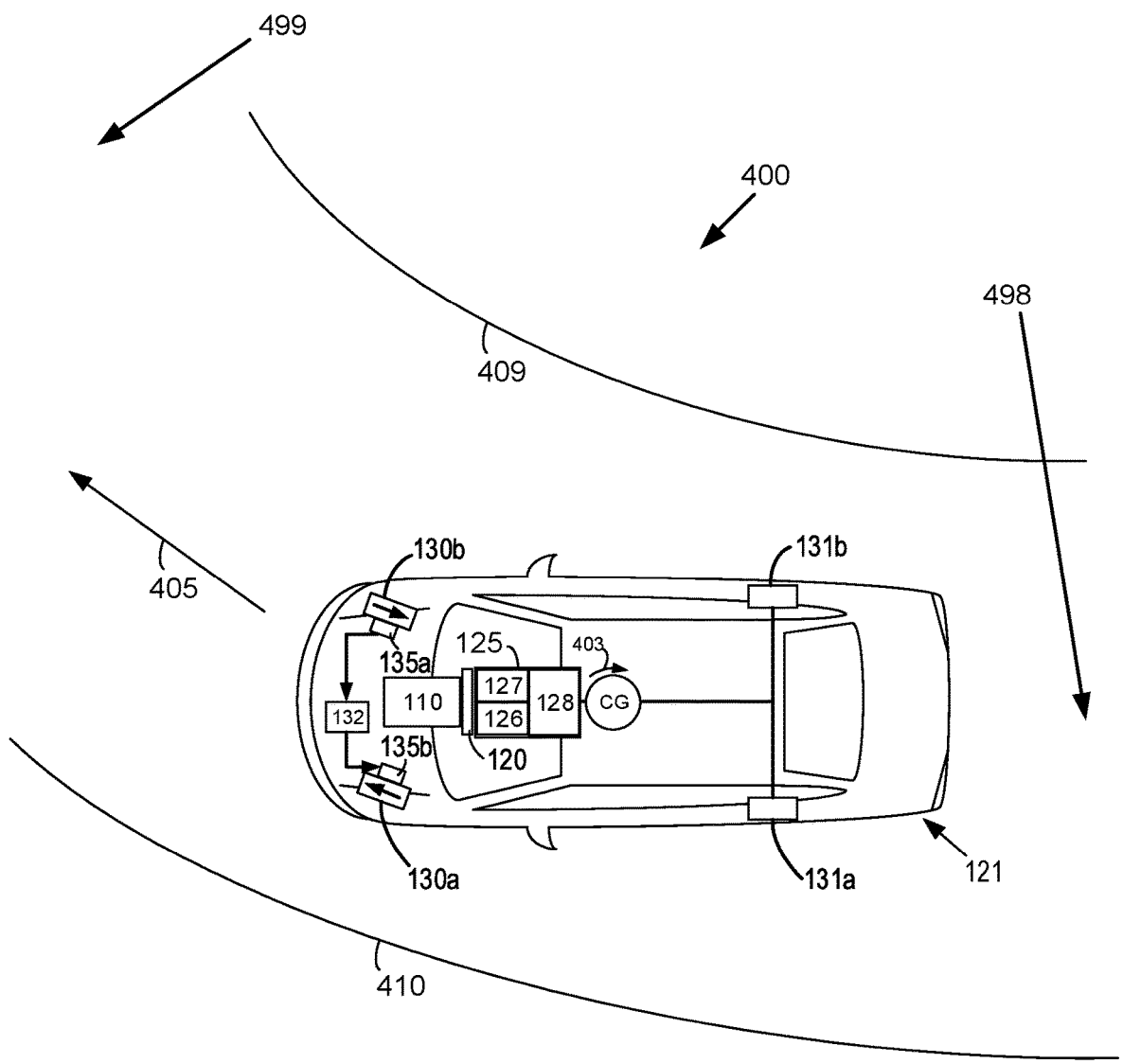
FIG. 4 shows a sketch of a vehicle that is preparing to enter a drifting maneuver.
Figure 5:
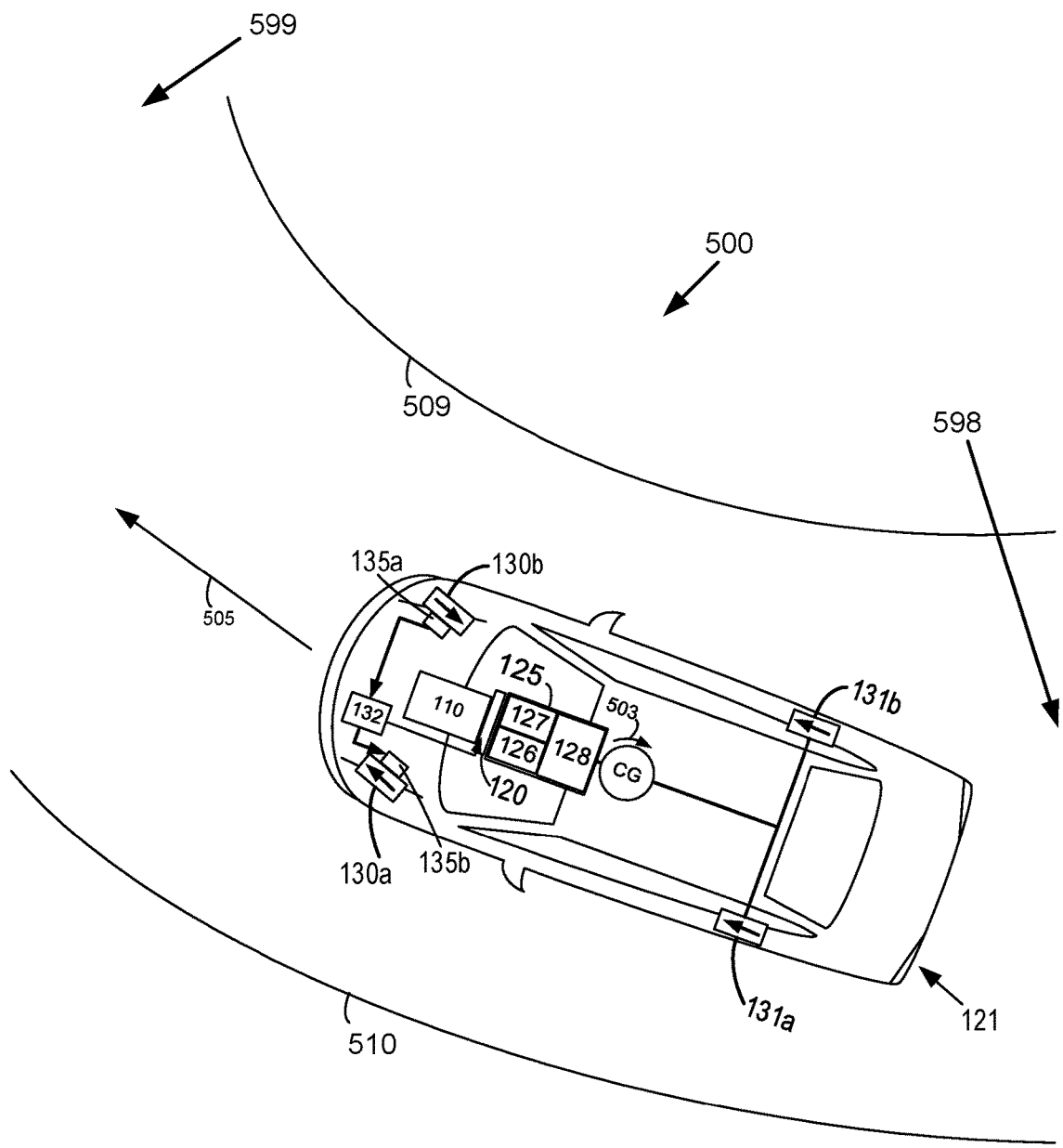
FIG. 5 shows a sketch of a vehicle utilizing first torque vectoring approach to operate in a drifting mode.
Figure 6:
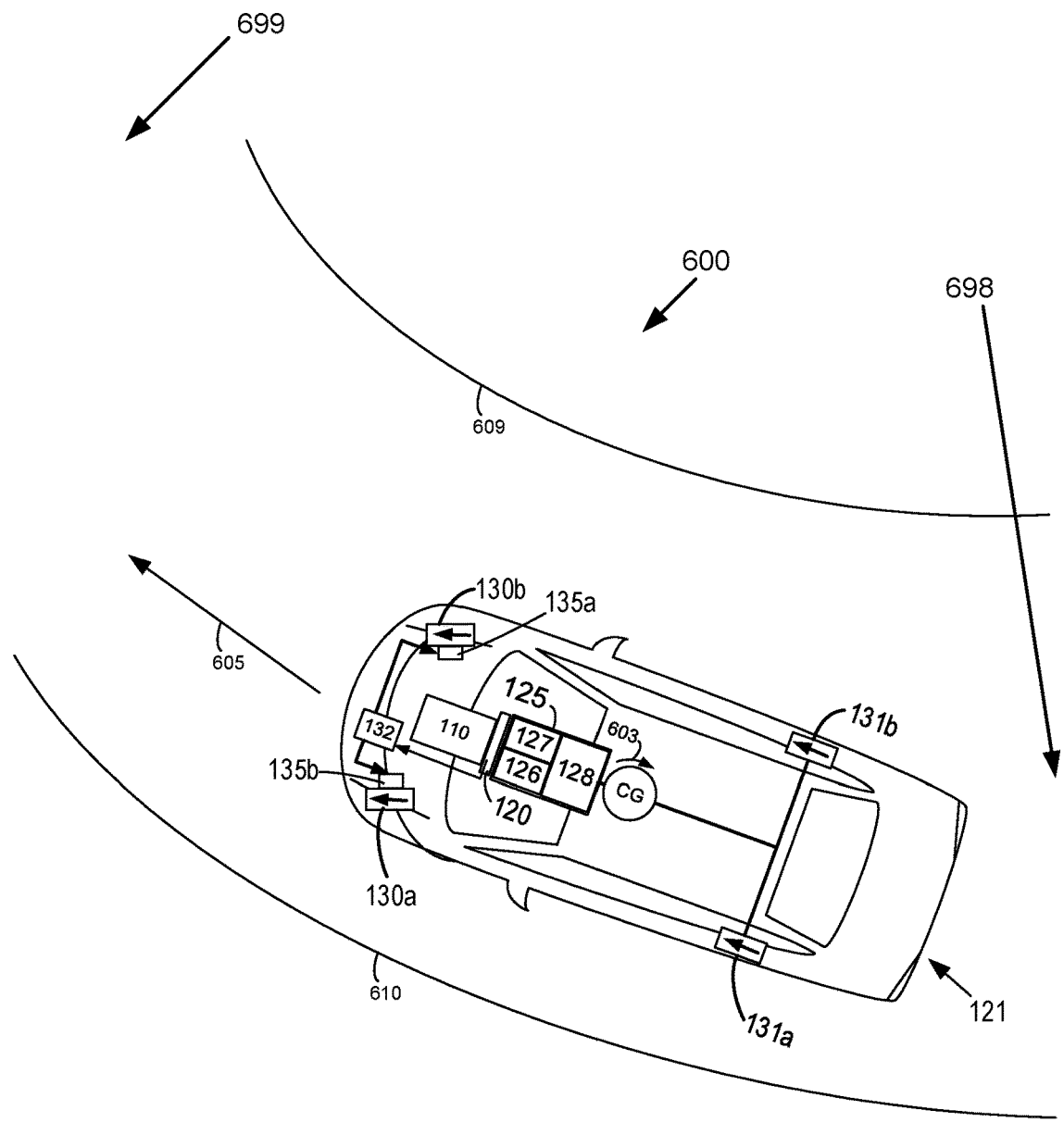
FIG. 6 shows a sketch of a vehicle utilizing a second torque vectoring approach to operate in a drifting mode.
Figure 7:
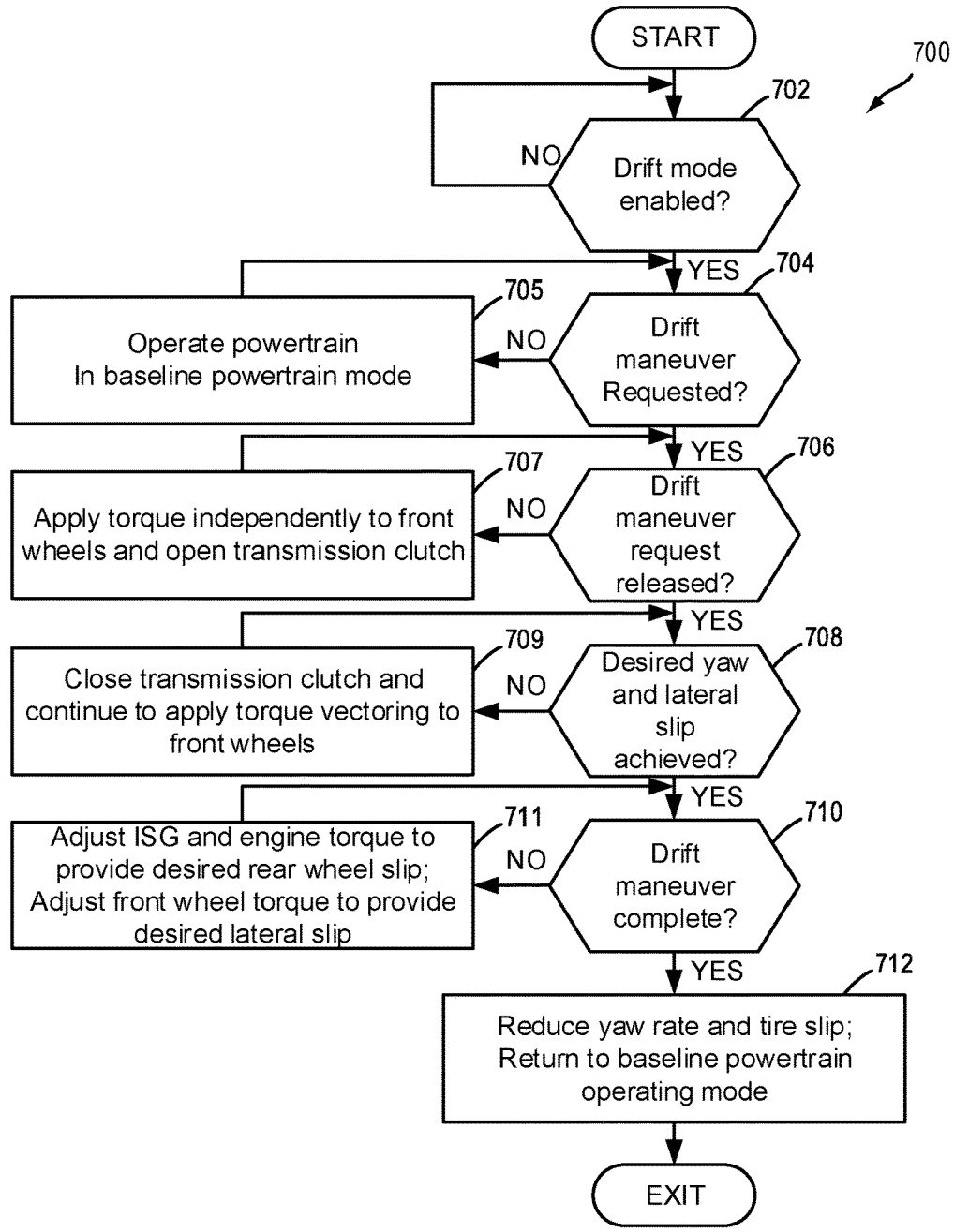
FIG. 7 shows a method for operating a vehicle in a drifting mode.
Figure 8A:
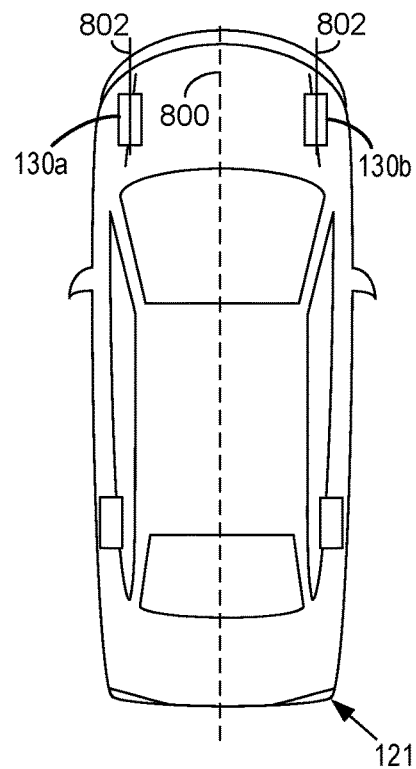
FIGS. 8A and 8B show a graphic depiction of two different steering angles.

The following description relates to systems and methods for operating a driveline or powertrain of a hybrid vehicle. FIGS. 1A-3B show example hybrid vehicle systems that includes a driveline with an internal combustion engine, an integrated starter/generator, two different transmissions, and an electric machine that may be operated in a regeneration mode to store a vehicle's kinetic as electrical energy. FIGS. 4-6 show a hybrid vehicle operating in different ways to facilitate operating the hybrid vehicle in a vehicle drifting mode. FIG. 7 describes a method for operating a hybrid vehicle. FIGS. 8A-9 show graphic depictions of vehicle operating conditions including steering angle and lateral slip.

Figure 1A:
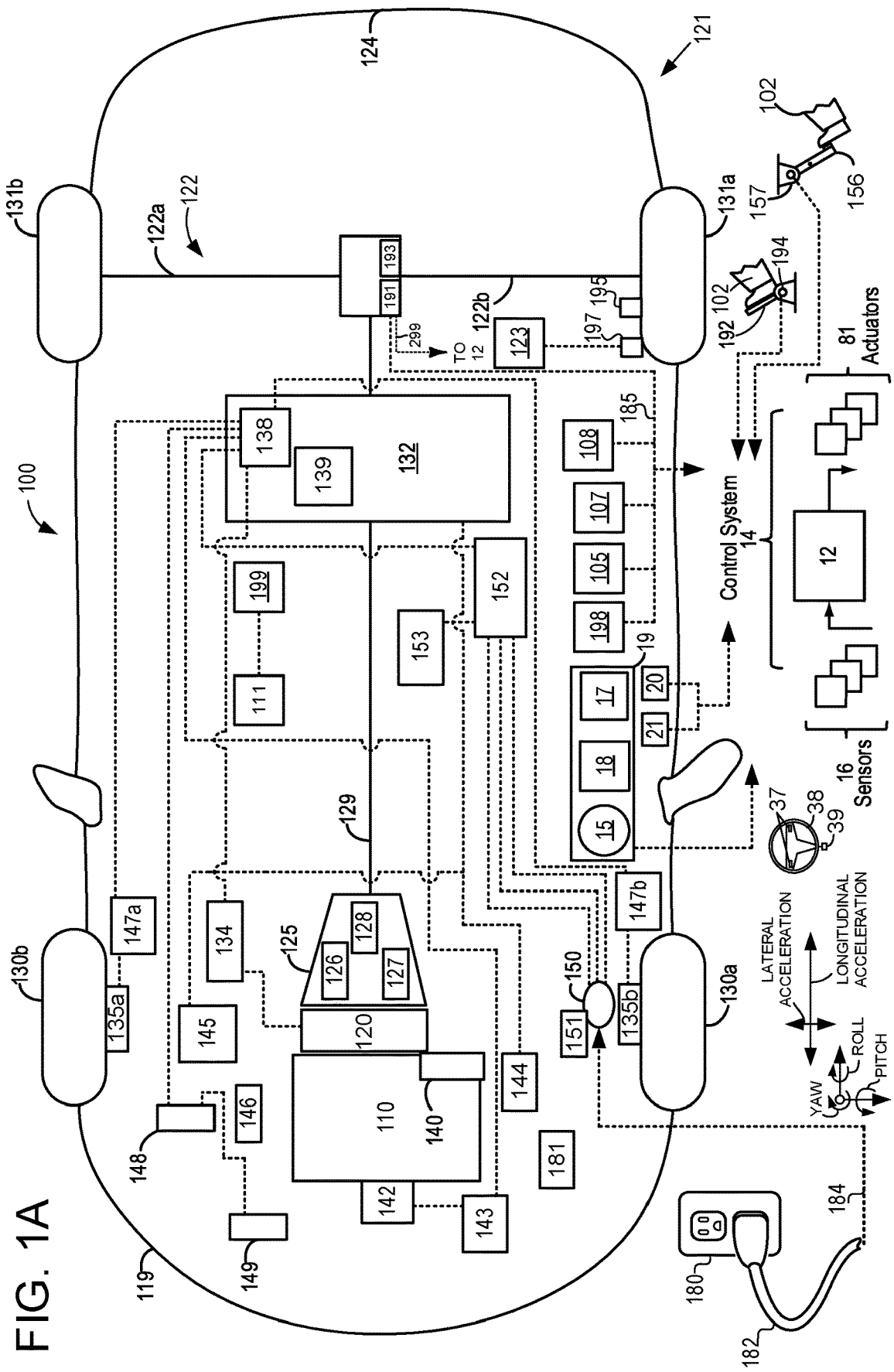
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. The front axle is positioned near front 119 of vehicle 121 and the rear axle 122 is positioned near rear 124 of vehicle 121. In some examples, rear axle 122 may comprise two half shafts, for example first half shaft 122a, and second half shaft 122b. Vehicle propulsion system 100 further has front wheels 130a (left) and 130b (right) and rear wheels 131a (left) and 131b (right). In this example, front wheels 130a (left) and 130b (right) are driven via electric machines 135a and 135b. Rear wheels 131a (left) and 131b (right) are driven via electric machine 120, belt integrated starter/generator 142, and/or via engine 110. The rear axle 122 is coupled to differential 136, and differential 193 is coupled to transmission 125 via driveshaft 129. The rear axle 122 may be driven either purely electrically and exclusively via electric machine 120 and/or belt integrated starter/generator 142 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Differential 193 may transfer power from engine 110 and/or electric machine 120, to axle 122, resulting in rotation of drive wheels 131a (left) and 131b (right). Differential 193 may include an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Differential 193 may also include one or more clutches (not shown) to decouple transmission 125 and electric machine 120 from wheels 131a (left) and 131b (right). Differential may be directly coupled to axle 122.

A transmission 125 is illustrated in FIG. 1A is connected between driveshaft 129 and electric machine 120. Engine 110 is coupled to electric machine 120. In some examples, a driveline disconnect clutch (not shown) may be positioned between electric machine 120 and engine 110. In one example, transmission 125 is a dual clutch transmission (DCT). In another example, transmission 125 is an automatically shifted manual transmission (ASM). In an example wherein transmission 125 is a DCT, DCT may include a first clutch 126, a second clutch 127, and a gear box 128. DCT 125 outputs torque to drive shaft 129 to supply torque to wheels 131a (left) and 131b (right). As will be discussed in further detail below with regard to FIG. 2, transmission 125 may shift gears by selectively opening and closing first clutch 126 and second clutch 127.

Electric machine 120 and belt integrated starter/generator 142 may receive electrical power from onboard electrical energy storage device 132. Furthermore, electric machine 120 and belt integrated starter/generator 142 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. Lateral and longitudinal directions and the directions of yaw, pitch, roll, with respect to the orientation of vehicle 121 are as indicated. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual coiner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131*a* (left) and 131*b* (right) and configured to monitor a pressure in a tire of wheel 131*a* (left) and 131*b* (right). While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135*a* and 135*b* to propel vehicle 121 or to provide regenerative braking via front wheels 130*a* (left) and 130*b* (right). Friction brakes (not shown) may be applied to slow front wheels 130*a* (left) and 130*b* (right). Third inverter (ISC3) 147*a* may convert alternating current generated by electric machine 135*a* to direct current for storage at the electric energy storage device 132 or provide alternating current to electric machine 135*a* to propel vehicle 121. Likewise, fourth inverter (ISC4) 147*b* may convert alternating current generated by electric machine 135*b* to direct current for storage at the electric energy storage device 132 or provide alternating current to electric machine 135*b* to propel vehicle 121. Electric machines 135*a* and 135*b* may be collectively referred to as front wheel electric machines. Alternatively, a single front wheel electric machine may drive and/or provide regenerative braking to both front wheels 130*a* (left) and 130*b* (right) as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Vehicle system controller 12 may comprise a portion of a control system 14. In some examples, vehicle system controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, steering angle sensor 181, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIGS. 3A and 3B. Vehicle system controller 12 may also receive gear shift requests via shift paddles 37 which are mounted to steering wheel 38. Steering angle may be determined via steering angle sensor 39, which may be coupled to steering wheel 38 or steering linkage (not shown).

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149 for controlling an electric air conditioning compressor (not shown).

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, transmission 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle system controller 12 to start the engine. The controllers (e.g., 12, 111b, 139, etc.) receive signals from the various sensors of FIGS. 1A-3B and employ the various actuators of FIGS. 1A-3B to adjust vehicle operation based on the received signals and instructions stored in memory of the controllers.

Figure 1B:
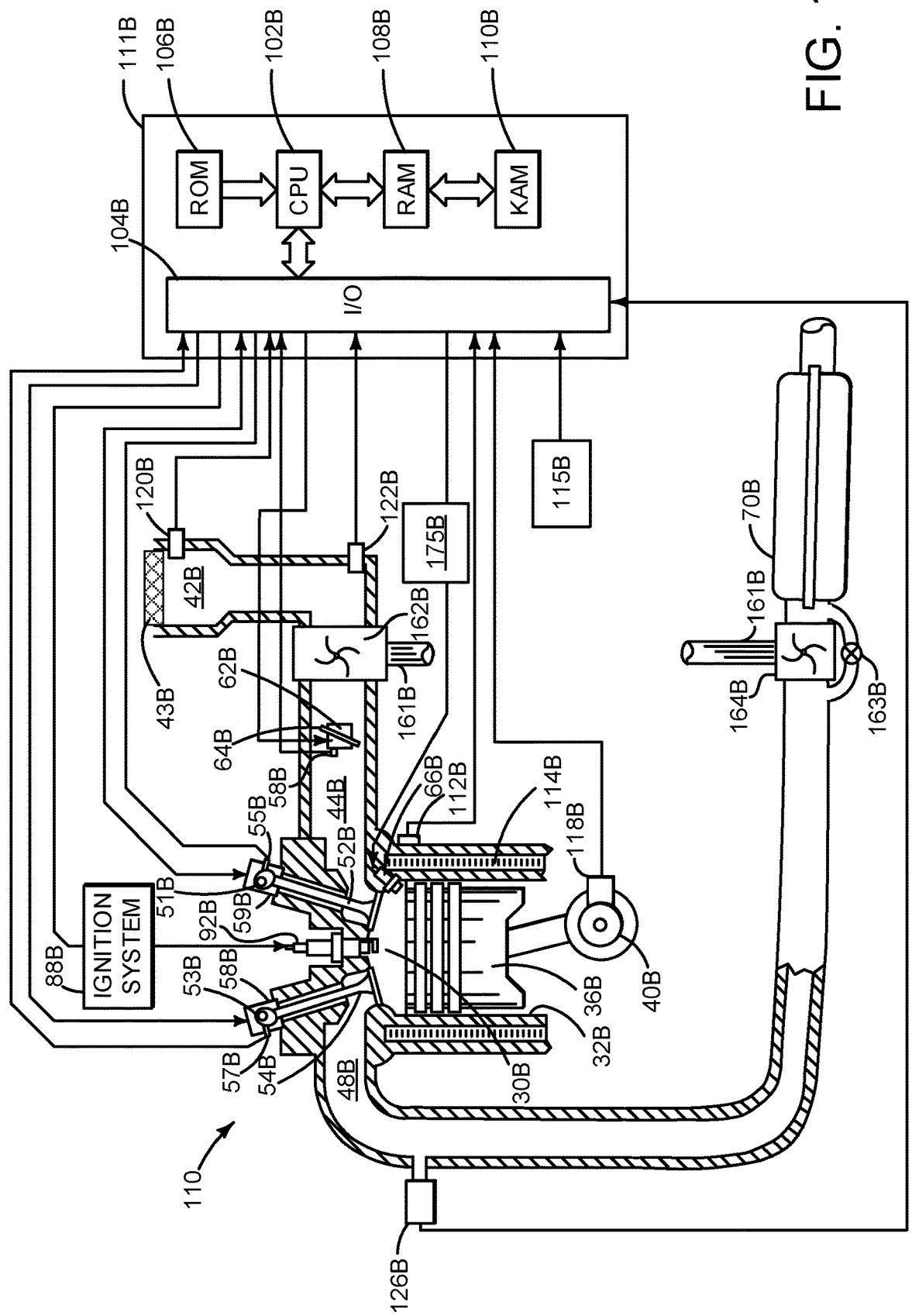
FIG. 1B is a sketch of an engine of the hybrid vehicle driveline.
Figure 1C:
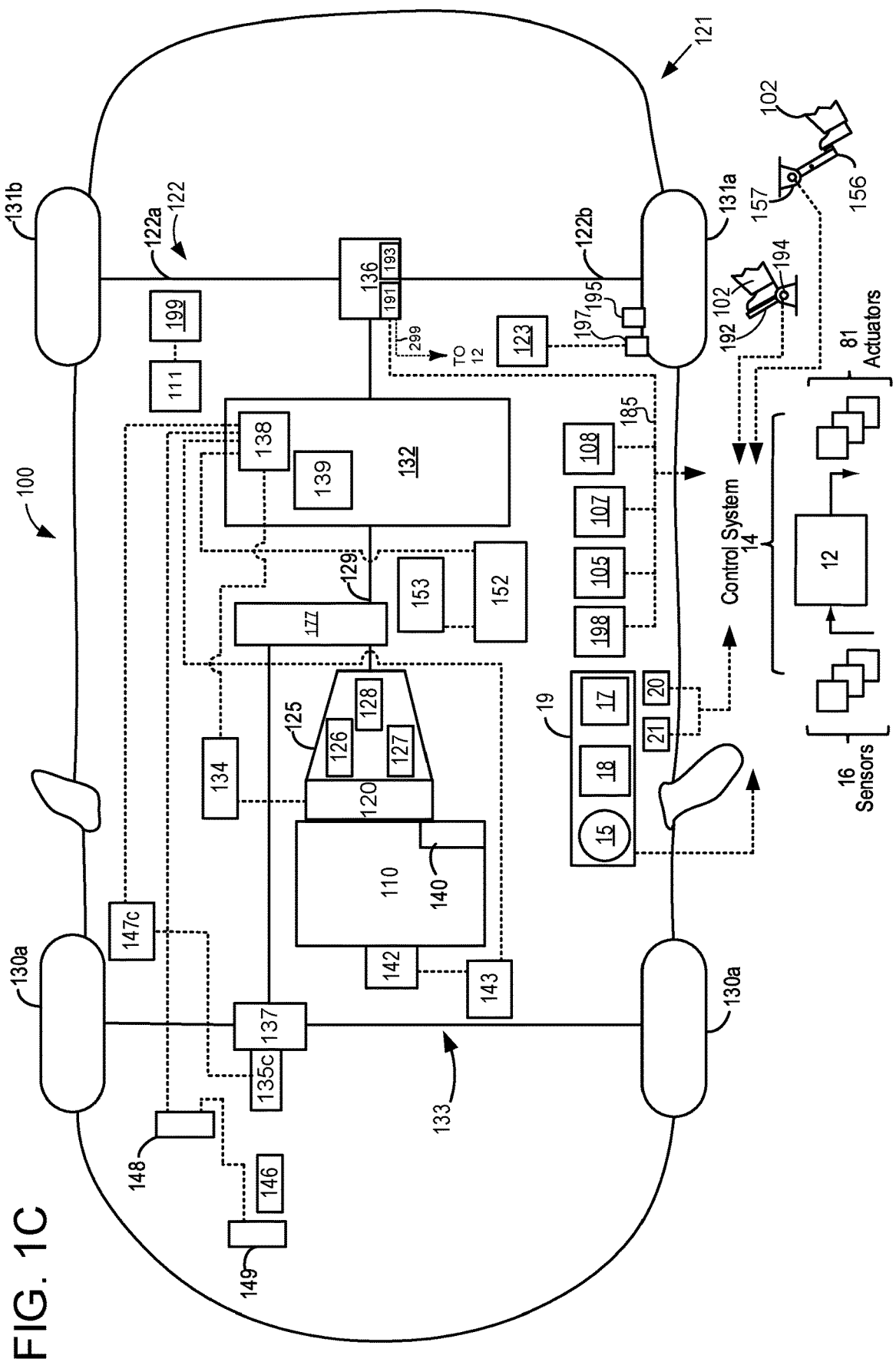
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Engine 110 is also shown with a turbocharger that includes compressor 162B and turbine 164B. Exhaust gases impart force to turbine 164B which rotates shaft 161B. Compressor 162B is rotated via shaft 161B. Boost pressure (e.g., pressurized air) provided by compressor 162B may be adjusted via adjusting a position of waste gate 163B. For example, waste gate 163B may be closed to increase boost pressure. Waste gate 163B may be opened to decrease boost pressure. Waste gate 163B may allow exhaust gases to bypass turbine 164B.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples. Ignition system 88B, fuel injector 66B, and throttle 62B may be referred to as engine torque actuators.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130a (left) and 130b (right) via front drive unit 137, which may include a differential. Alternatively, positive or negative torque may be provided to front wheels 130a (left) and 130b (right) via all-wheel drive transfer case 177, which may be coupled to transmission 125. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

Figure 2:
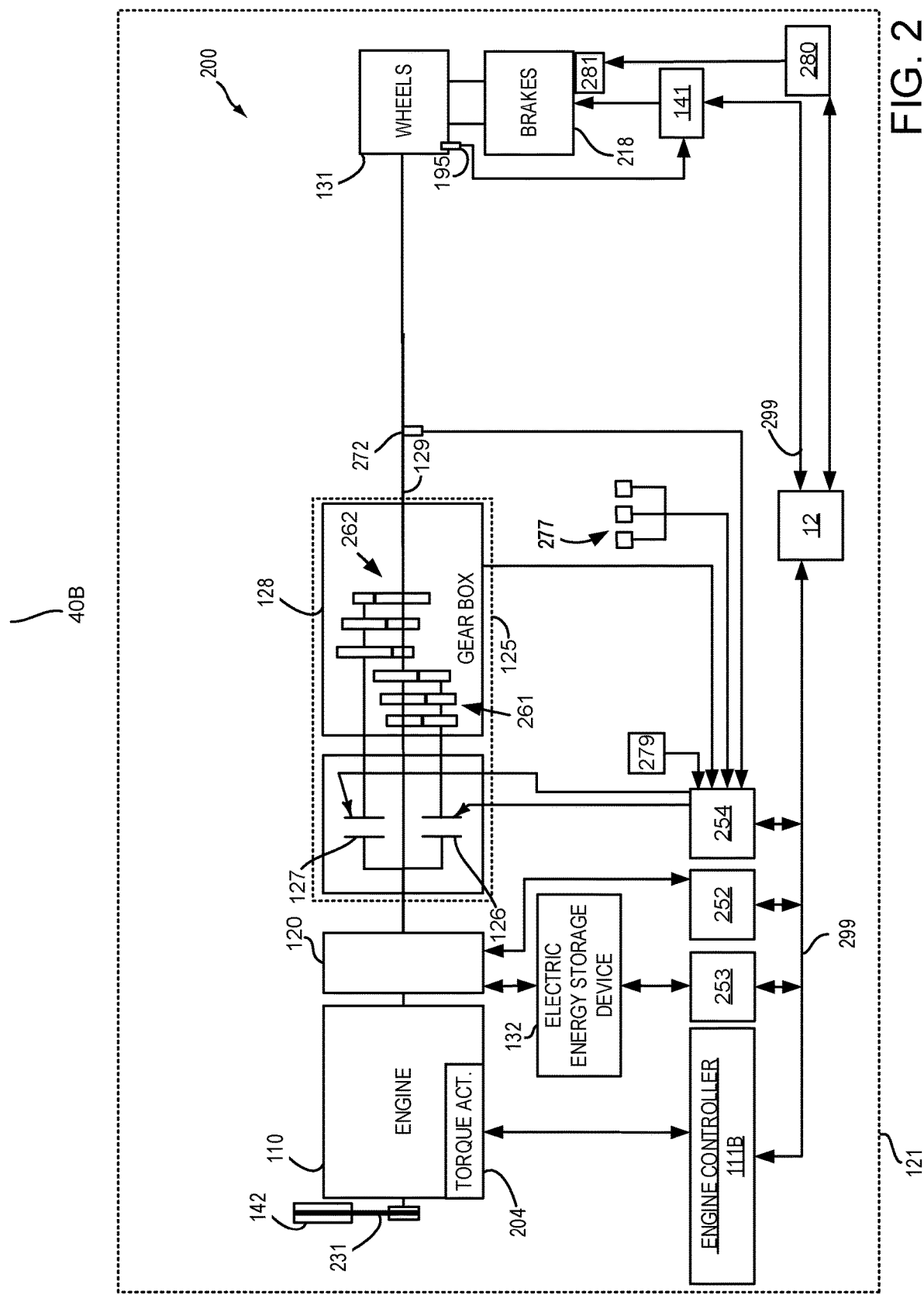
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131a (left) and 131b (right).

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to transmission (e.g., DCT) 125 via crank shaft 40B. Transmission 125 may include a first clutch 126, a second clutch 127, and a gear box 128. Transmission 125 outputs torque to shaft 129, to supply torque to vehicle wheels 131a (left) and 131b (right). Transmission controller 254 selectively opens and closes first clutch 126 and second clutch 127 to shift transmission 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to transmission 125, and transmission 125 is mechanically coupled to wheels 131a (left) and 131b (right) via differential 193 (shown in FIG. 1A). Electric machine 120 may provide a positive torque or a negative torque to powertrain 200 via operating as a motor or generator as instructed by electric machine controller 252.

Further, a frictional force may be applied to wheels 131a (left) and 131b (right) by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131a (left) and 131b (right) by disengaging wheel brakes 218 in response to the driver releasing his foot from a brake pedal, brake controller instructions, and/or vehicle system controller instructions and/or information. For example, vehicle brakes may apply a frictional force to wheels 131a (left) and 131b (right) via brake controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, vehicle system controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if vehicle system controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131a (left) and 131b (right) in a direction starting at engine 110 and ending at wheels 131a (left) and 131b (right). Thus, according to the direction of positive torque flow in driveline 200, engine 110 is positioned in driveline 200 upstream of electric machine 120. Electric machine 120 is positioned upstream of transmission 125. BISG 142 may be positioned upstream of engine 110, or downstream of engine 110.

Figure 3A:
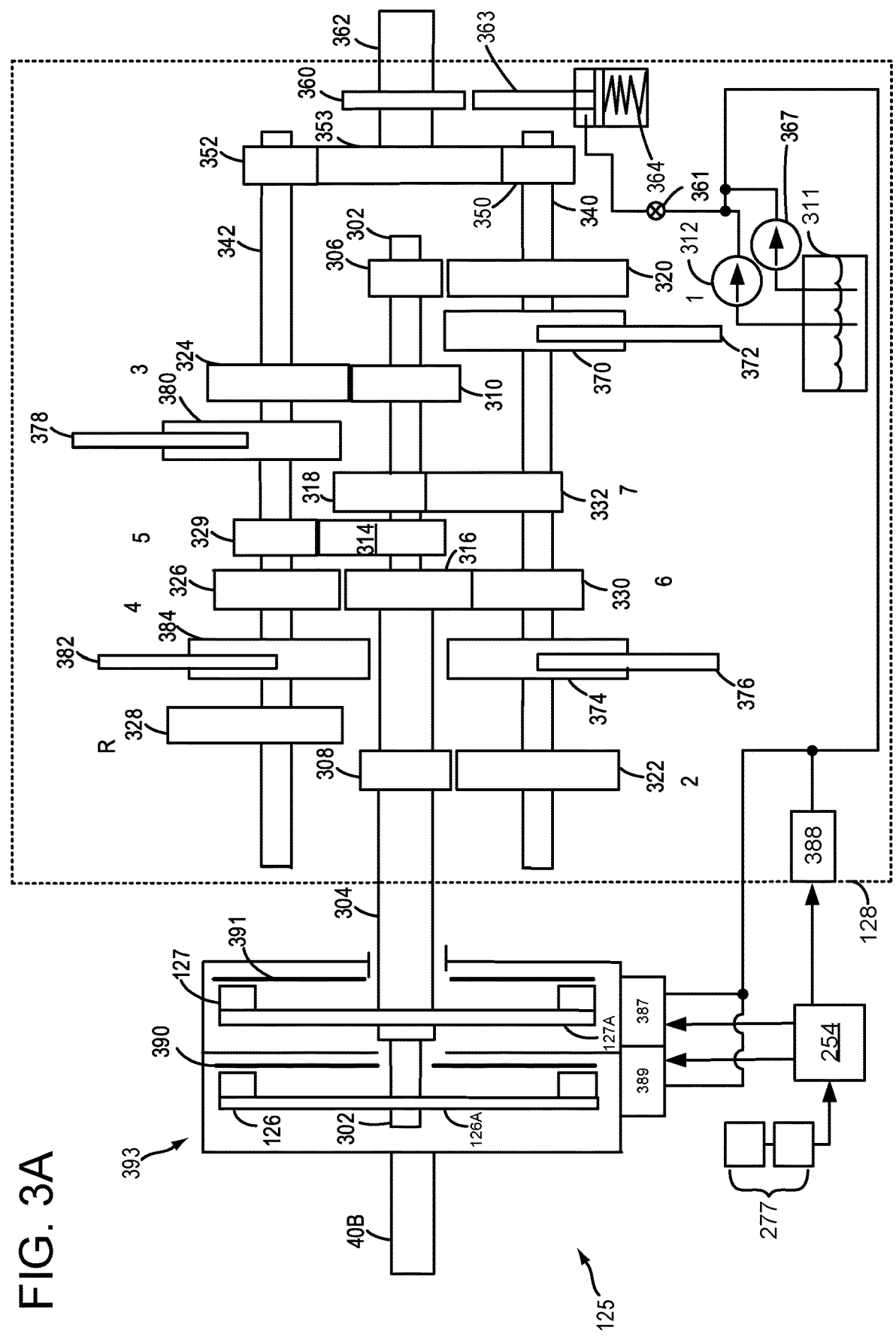
FIG. 3A is a schematic diagram of a dual clutch transmission that may be located in the hybrid vehicle driveline.

FIG. 3A shows a detailed illustration of transmission 125, which in this example is a DCT. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft 340, and second layshaft 342. Gears on first layshaft 340 and second layshaft 342 are not fixed, but may freely rotate. In example DCT 125, first layshaft 340 includes first gear 320, second gear 322, sixth gear 330, and seventh gear 332. Second layshaft 342 includes third gear 324, fourth gear 326, fifth gear 329, and reverse gear 328. Both first layshaft 340 and second layshaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131a (left) and 131b (right) of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 384. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such, TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

Transmission 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

Transmission 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Transmission 125 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130*a* (left) and 130*b* (right), 131*a* (left) and 131*b* (right)) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Figure 3B:
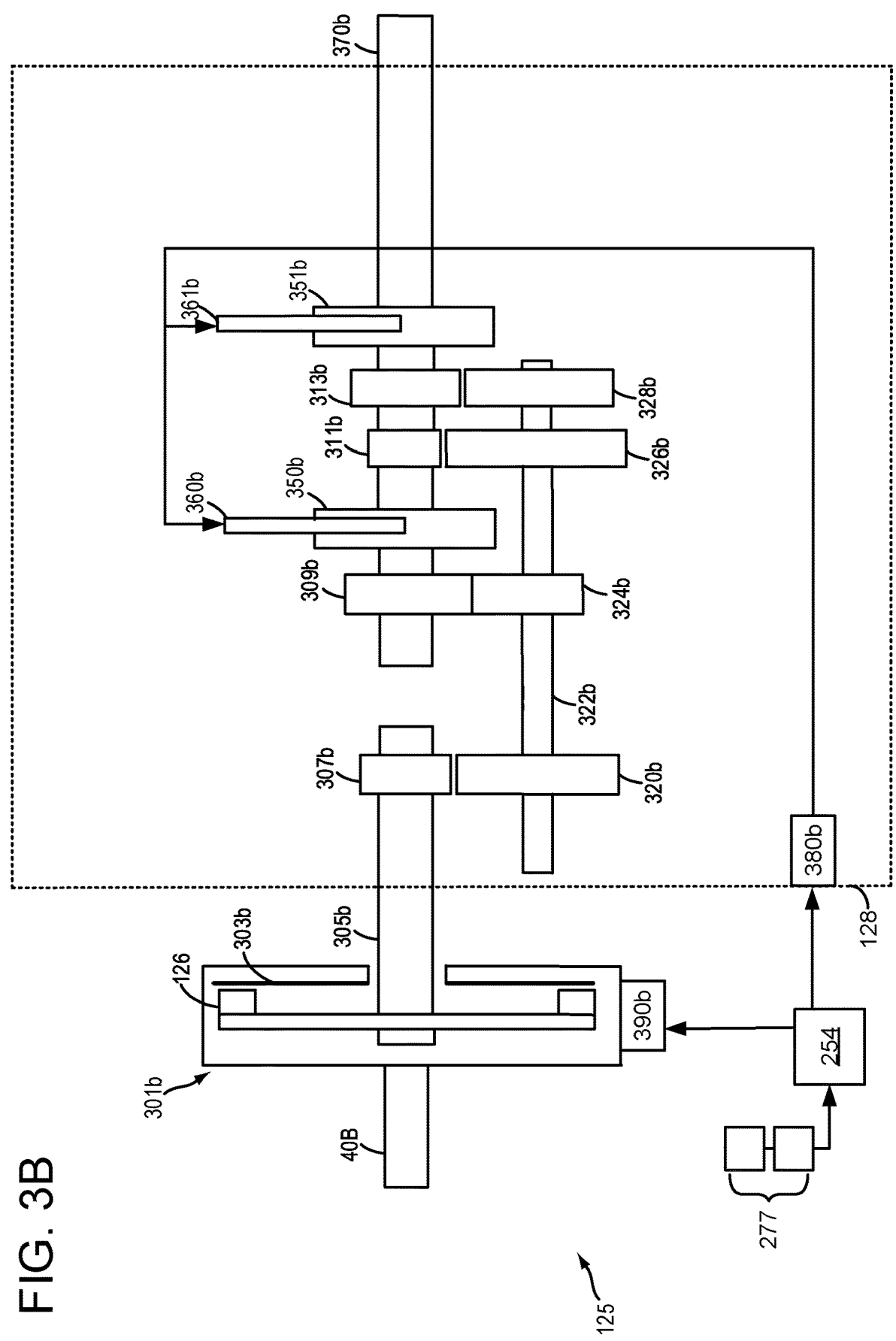
FIG. 3B is a schematic diagram of an automatic shift manual transmission that may be located in the hybrid vehicle driveline.

Referring now to FIG. 3B, a second example transmission 125 is shown. In this example, transmission 125 is an automatically shifted manual (ASM) transmission. Transmission includes only a first clutch 126. First clutch 126 is coupled to transmission input shaft 305*b*. Clutch housing 301*b* is mechanically coupled to engine crankshaft 40B. Housing 301*b* includes a plate 303*b* for transferring engine torque to first clutch 126 and transmission input shaft 305*b*. First clutch 126 may be opened via clutch actuator 390*b* to cease transfer of engine and electric machine torque to input shaft 305*b*. Alternatively, clutch actuator 390*b* may close first clutch 126 to permit torque transfer from engine 110 and electric machine 120 to transmission input shaft 305*b*.

Transmission input shaft 305*b* includes a gear 307*b* that is coupled with gear 320*b* of layshaft 322*b*, thereby coupling transmission input shaft 305*b* to layshaft 322*b*. Layshaft 322*b* includes a plurality of gears including 324*b*, 326*b*, and 328*b* that are coupled with gears 309*b*, 311*b*, and 313*b* of transmission output shaft 370*b*. Gears 309*b*, 311*b*, and 313*b* rotate freely about output shaft 370*b*. Shift forks 360*b* and 361*b* may be moved to selectively couple gears 309*b*, 311*b*, and 313*b* to output shaft 370*b* via synchronizers 350*b* and 351*b*. Gear shifting actuator 380*b* may selectively move shift forks 360*b* and 361*b* to engage gears 309*b*, 311*b*, and 313*b* to shift transmission 125. TCM 254 receives input data from sensors 277 and CAN 299 shown in FIG. 2. TCM 254 may open and close first clutch 126 and engage and disengage gears 309b, 311b, and 313b responsive to vehicle operating conditions and commands from vehicle system controller 12.

Thus, the systems shown in FIGS. 1A-3B provide for a vehicle system, comprising: a vehicle powertrain including an engine coupled to a first electric machine and a transmission coupled to the first electric machine; a second electric machine coupled to a first front wheel and a third electric machine coupled to a second front wheel; a human/machine interface; and a controller including executable instructions stored in non-transitory memory to receive a vehicle drift maneuver request via the human/machine and provide a negative torque via the first electric machine and a positive torque via the engine in response to the vehicle drift maneuver request. The vehicle system further comprises additional instructions to increase boost provided via a turbocharger coupled to the engine in response to the vehicle drift maneuver request. The vehicle system further comprises additional instructions to provide a same powertrain torque as a function of accelerator pedal position before receiving the vehicle drift maneuver request as after receiving the vehicle drift maneuver request. The vehicle system includes where a first gear of the transmission is engaged when the vehicle drive maneuver request is received, and further comprising: additional instructions to engage a second gear of the transmission in response to receiving the vehicle drift maneuver request, and where the second gear is a lower gear than the first gear. The vehicle system further comprises additional instructions to receive a request to generate vehicle lateral slip via the human/machine interface and deliver engine torque to vehicle wheels via the second gear in response to the request to generate vehicle lateral slip.

The vehicle system of claim 15, further comprising additional instructions to engine torque and the electric machine torque in response to vehicle speed.

Referring now to FIG. 4, a sketch illustrating example vehicle operation for initiating a vehicle drift maneuver is shown. The vehicle operation shown in FIG. 4 may be provided via the method of FIG. 7 in cooperation with the system shown in FIGS. 1A-3B.

Vehicle 121 is shown with engine 110, electric machine 120, transmission 125, first clutch 126, second clutch 127, gearbox 128, front right wheel 130b, front left wheel 130a, rear right wheel 131b, and rear left wheel 131a as previously described. Vehicle 121 is shown negotiating road corner 400 while traveling in direction 405. Road corner 400 includes an inside 409 and an outside 410. Road corner 400 also includes an entrance 498 and an exit 499. In this example, road corner 400 is a right hand corner so that vehicle 121 turns right when moving through road corner 400. Right front wheel 130b is an inside front wheel since it is the closest front wheel to inside 409 of road corner 400. Left front wheel 130a is an outside front wheel since it is the closest front wheel to outside 410 of road corner 400. The distance from entrance 498 to exit 499 via inside corner 409 is shorter than the distance from entrance 498 to exit 499 via outside corner 410.

To setup or initiate the vehicle drift maneuver before the vehicle begins to drift, one of clutches 126 and 127 is opened so that both clutches 126 and 127 are open. This ceases power delivery to the rear wheels 131a and 131b as indicated by the absence of arrows within the rear tires. Torque supplied to front wheels 130a and 130b may be increased to compensate for the loss of rear wheel torque. An arrow opposite the direction of vehicle travel 405 indicates negative or braking (e.g., regenerative) torque is being provided to the wheel to slow vehicle 121. An arrow in the direction of vehicle travel 405 indicates a propulsive (e.g., positive) torque is being provided to the wheel to propel vehicle 121. Front inside wheel 130b is provided with a regenerative (e.g., negative) torque via electric machine 135a. Front outside wheel 130a is provided with a propulsive (e.g., positive) torque via electric machine 135b. The propulsive torque that is applied to the left front wheel and the regenerative torque that is applied to the front right wheel provide a moment to vehicle 121, but the moment may be provided such that it is not sufficient to induce yaw in vehicle 121. The circle labeled CG represents the center of gravity for vehicle 121. The desired vehicle yaw direction for vehicle 121 to negotiate road curve 400 is indicated by arrow 403. Vehicle system controller 12 may determine the desired yaw direction as a function of steering angle sensor input. Electrical charge generated via operating electric machine 135a in a regenerative mode is supplied to electric energy storage device 132. Electric charge used to propel vehicle 121 via electric machine 135b is provided by electric energy storage device 132.

Engine 110 is operated in a speed control mode after both clutches 126 and 127 opened. In speed control mode, engine speed is controlled to a desired speed, such as a constant speed, while engine torque is adjusted (e.g., increased and/or decreased) so that engine speed follows the desired speed. The desired engine speed may be a function of vehicle speed and steering angle when the vehicle drift maneuver is initially requested. In addition, boost pressure in the engine's intake system (e.g., between the engine throttle and the turbocharger compressor) is adjusted so that pressurized air is available to the engine when the request to generate lateral vehicle slip is provided after the vehicle drift maneuver request is received. The boost pressure may be increased to a predetermined pressure. The torque of electric machine 120 may also be adjusted to a predetermined negative torque to resist at least a portion of engine torque produced. Since the engine is operating in a speed control mode, engine torque may be increased if a magnitude of negative torque provided by the electric machine is increased so that engine speed may be maintained at the desired engine speed. By increasing engine torque and converting at least a portion of torque produced by the engine to electrical energy via the electric machine, the engine may be operated at a higher torque so that a torque production delay by the engine may be avoided.

In this way, the driveline or powertrain operating conditions may be pre-adjusted to increase the possibility of entering the vehicle into a desired controlled lateral slip condition. If the vehicle driver generates a request for the vehicle laterally slip, the torque being produced via the engine may be nearly immediately released to the vehicle's wheels via closing one of the transmission clutches and ceasing to provide braking torque via the electric machine.

Referring now to FIG. 5, a sketch illustrating example vehicle operation for providing a requested amount of lateral vehicle slip, vehicle yaw, and rear wheel slip during a vehicle drift maneuver is shown. The vehicle operation shown in FIG. 5 may be provided via the method of FIG. 7 in cooperation with the system shown in FIGS. 1A-3B.

Vehicle 121 is shown with engine 110, electric machine 120, transmission 125, first clutch 126, second clutch 127, gearbox 128, front right wheel 130b, front left wheel 130a, rear right wheel 131b, and rear left wheel 131a as previously described. Vehicle 121 is shown negotiating road corner 500 while traveling in direction 505. Road corner 500 includes an inside 509 and an outside 510. Road corner 500 also includes an entrance 598 and an exit 599. In this example, road corner 500 is a right hand corner so that vehicle 121 turns right when moving through road corner 500. Right front wheel 130b is an inside front wheel since it is the closest front wheel to inside 509 of road corner 500. Left front wheel 130a is an outside front wheel since it is the closest front wheel to outside 510 of road corner 500. The distance from entrance 598 to exit 599 via inside corner 509 is shorter than the distance from entrance 598 to exit 599 via outside corner 510.

To maintain a desired amount of vehicle lateral slip, rear wheel slip, and yaw, torque supplied to left front wheel 130a and right front wheel 130b is adjusted so that a propulsive torque is applied to left front wheel 130a via electric machine 135b and a regenerative torque is applied to right front wheel 130b via electric machine 135a. The torque amounts provided to the front wheels may be equal and opposite. Further, engine 110 and/or electric machine 120 supply torque to left rear wheel 131a and right rear wheel 131b. The torque provided to left rear wheel 131a and right rear wheel 131b may be equal. However, torque distribution to left rear wheel 131a and right rear wheel 131b may be different from the left rear wheel to the right rear wheel to further provide control of vehicle yaw via adjusting a clutch closing force applied to differential clutch 191. The circle labeled CG represents the center of gravity for vehicle 121, and the desired vehicle yaw direction for vehicle 121 to negotiate road curve 500 is indicated by arrow 503.

Engine 110 is operated in a torque control mode after one of clutches 126 and 127 is closed. In torque control mode, engine torque is controlled to a desired torque as a function of accelerator pedal position while engine speed is allowed to vary. In addition, boost pressure in the engine's intake system is adjusted responsive to accelerator pedal position and desired vehicle yaw rate. The torque output of electric machine 120 may also be adjusted according to accelerator pedal position and the desired vehicle yaw rate.

In this way, the driveline or powertrain operating conditions may be adjusted to maintain a desired amount of vehicle lateral slip, rear wheel slip, and yaw. In some examples, the desired amount of lateral slip, rear wheel slip, and yaw may be adjusted responsive to the steering angle and the accelerator pedal position.

Referring now to FIG. 6, a sketch illustrating example vehicle operation for maintaining a vehicle drift maneuver is shown. The vehicle operation shown in FIG. 6 may be provided via the method of FIG. 7 in cooperation with the system shown in FIGS. 1A-3B.

Vehicle 121 is shown with engine 110, electric machine 120, transmission 125, first clutch 126, second clutch 127, gearbox 128, front right wheel 130b, front left wheel 130a, rear right wheel 131b, and rear left wheel 131a as previously described. Vehicle 121 is shown negotiating road corner 600 while traveling in direction 605. Road corner 600 includes an inside 609 and an outside 610. Road corner 600 also includes an entrance 698 and an exit 699. In this example, road corner 600 is a right hand corner so that vehicle 121 turns right when moving through road corner 600. Right front wheel 130b is an inside front wheel since it is the closest front wheel to inside 609 of road corner 600. Left front wheel 130a is an outside front wheel since it is the closest front wheel to outside 610 of road corner 600. The distance from entrance 698 to exit 699 via inside corner 609 is shorter than the distance from entrance 698 to exit 699 via outside corner 610.

A desired amount of vehicle lateral slip, rear wheel slip, and yaw may be supplied via adjusting torque supplied to the front and rear wheels. In particular, torque supplied to left front wheel 130a and right front wheel 130b is adjusted so that a propulsive torque is applied to left front wheel 130a via electric machine 135b and a propulsive torque is applied to right front wheel 130b via electric machine 135a. Thus, the front wheels operate in a positive propulsive torque only mode. The torque amounts provided to the front wheels may be a function of the steering angle, the desired vehicle yaw rate, and the desired vehicle lateral slip amount. Further, engine 110 and/or electric machine 120 supply torque to left rear wheel 131a and right rear wheel 131b. The torque provided to left rear wheel 131a and right rear wheel 131b may be equal. However, torque distribution to left rear wheel 131a and right rear wheel 131b may be different from the left rear wheel to the right rear wheel to further provide control of vehicle yaw via adjusting a clutch closing force applied to differential clutch 191. The circle labeled CG represents the center of gravity for vehicle 121, and the desired vehicle yaw direction for vehicle 121 to negotiate road curve 600 is indicated by arrow 603.

Engine 110 is operated in a torque control mode after one of clutches 126 and 127 is closed. In torque control mode, engine torque is controlled to a desired torque as a function of accelerator pedal position while engine speed is allowed to vary. In addition, boost pressure in the engine's intake system is adjusted responsive to accelerator pedal position and desired vehicle yaw rate. The torque output of electric machine 120 may also be adjusted according to accelerator pedal position and the desired vehicle yaw rate.

In this way, the driveline or powertrain operating conditions may be adjusted to maintain a desired amount of vehicle lateral slip, rear wheel slip, and yaw. In some examples, the desired amount of lateral slip, rear wheel slip, and yaw may be adjusted responsive to the steering angle and the accelerator pedal position.

Referring now to FIG. 7, an example method for operating a hybrid driveline to induce and control a vehicle in a drift maneuver is shown. The method of FIG. 7 may be incorporated into and may cooperate with the system of FIGS. 1A-3B. Further, at least portions of the method of FIG. 7 may be incorporated as executable instructions stored in non-transitory memory while other portions of the method may be performed via a controller transforming operating states of devices and actuators in the physical world. Instructions for carrying out method 700 may be executed by a controller based on instructions stored in memory of the controller and in conjunction with signals received from sensors of the engine system, such as the sensors described above with reference to FIGS. 1A-3B. The controller may employ engine actuators of the engine system to adjust driveline operation, according to the methods described below. Further, the controllers described herein may include instructions for operating the vehicle driveline at all the conditions described herein.

At 702, method 700 judges if vehicle drift mode is enabled. In one example, vehicle drift mode may be enabled when a human driver applies a button or switch on a human/machine interface. Alternatively, vehicle drift mode may be enabled by an automated or autonomous driver activating a digital output. The vehicle drift mode may be enabled via a controller (e.g., 12 of FIG. 1A) receiving an input of a request to enable vehicle drift mode via the human/driver interface or autonomous driver. Vehicle drift mode may be described as a mode where a vehicle provides an amount of vehicle lateral slip that is greater than a threshold, where the vehicle provides rear wheel slip that is greater than a threshold, and where the vehicle provides yaw or a yaw rate that is greater than a threshold. If method 700 judges that the vehicle drift mode is enabled, the answer is yes and method 700 proceeds to 704. Otherwise, the answer is no and method 700 returns to 702, or alternatively, exits.

At 704, method 700 judges if a vehicle drift maneuver has been requested. In one example, a vehicle drift mode may be requested via a human driver contemporaneously applying two paddle shift levers on a vehicle steering wheel. Alternatively, an autonomous driver may activate a digital input of vehicle system controller 12 or another controller. The vehicle drift maneuver may be requested via a controller (e.g., 12 of FIG. 1A) receiving an input of the request for the vehicle driver maneuver via the human/driver interface or autonomous driver. If method 700 judges that a vehicle drift maneuver has been requested, the answer is yes and method 700 proceeds to 706. Otherwise, the answer is no and method 700 proceeds to 705.

At 705, method 700 operates the powertrain in a baseline powertrain mode. In one example, the vehicle may receive a driver demand torque via an accelerator pedal. The driver demand torque is then allocated between the engine 110, electric machine 120, electric machine 135*a*, and 135*b*. For example, if the vehicle driver requests 100 Newton-meters (Nm) of wheel torque, the vehicle system controller 12 may command electric machines 135*a* and 135*b* to each provide 15 Nm of torque. Controller 12 may also request that electric machine 120 provide 30 Nm of torque to the rear wheels, including compensation for gear ratios between the wheels and electric machine. Controller 12 may request that engine 110 provide the balance of torque (40 Nm) to the rear wheels, including compensation for gear ratios between the wheels and the engine. The torque allocation between torque sources (e.g., engine 110, electric machine 120, etc.) may be responsive to vehicle operating conditions including, but not limited to road conditions. Further, method 700 may operate to provide a desired level of vehicle stability by providing less than a threshold amount of lateral vehicle slip during the baseline powertrain mode. In addition, method 700 may implement wheel slip control via limiting powertrain torque to provide less than a threshold amount of wheel slip. Method 700 independently adjusts torque supplied to the vehicle's front and rear wheels to provide a high level of vehicle stability during the baseline powertrain mode. Thus, the vehicle may provide a higher level of stability in the baseline powertrain mode.

At 706, method 700 judges if the vehicle drift maneuver has been released. Alternatively, releasing the drift maneuver may be described as making a request to generate vehicle lateral slip. In one example, the vehicle drift maneuver may be released via a human driver releasing the two paddle shift levers on the vehicle steering wheel. Alternatively, an autonomous driver may deactivate the digital input of vehicle system controller 12 or another controller. The vehicle maneuver release may be requested via a controller (e.g., 12 of FIG. 1A) receiving an input of the request to release the vehicle maneuver via the human/driver interface or the autonomous driver. If method 700 judges that a vehicle drift maneuver has been released, the answer is yes and method 700 proceeds to 708. Otherwise, the answer is no and method 700 proceeds to 707.

At 707, according to a first method, method 700 supplies torque independently to the vehicle's front wheels and method 700 opens one or more transmission clutches. In one example, method 700 supplies torque to the front wheels as a function of steering angle and vehicle speed. If the vehicle's driver has turned the steering wheel to move the front wheels to the right for negotiating a right hand turn, then method 400 applies a negative torque to the inside wheel or the front right wheel 130*b* via the electric machine 135*a*. Method 400 also applies a positive propulsive torque to the outside or left front wheel 130*a* via electric machine 135*b*. If the vehicle's driver has turned the steering wheel to move the front wheels to the left for negotiating a left hand turn, then method 400 applies a negative torque to the inside wheel or the front left wheel 130*a* via the electric machine 135*b*. Method 400 also applies a positive propulsive torque to the outside or right front wheel 130*b* via electric machine 135*a*. The torques provided to the front wheels may increase the moment about the vehicle's center of gravity without inducing yaw so that the vehicle may remain on the trajectory defined by the vehicle driver. The amounts of torque applied to the front wheels may be empirically determined and stored in controller memory as a function of vehicle speed and steering angle.

Method 700 also opens at least one transmission clutch to decouple the transmission's output shaft from the transmission input shaft. For example, if clutch 126 is closed and clutch 127 is open, method 700 opens clutch 126. By opening the transmission clutch, the transmission may be prepared to provide a large change in rear wheel torque to induce yaw when requested to do so. If the transmission is an ASM, then method 700 may simply open one clutch. If the transmission is a step ratio automatic transmission, method 700 may open one or more gear clutches.

According to the first method, method 700 also puts engine 110 in a speed control mode and controls engine speed to a predetermined speed. In one example, the predetermined engine speed is an engine speed at which the engine may output a threshold amount of torque. Alternatively, the engine speed may be adjusted to a speed that is a function of vehicle speed so that a gear may be quickly engaged at the present vehicle speed when requested to do so.

Method 700 also operates electric machine 120 in a torque control mode. Electric machine 120 is commanded to provide a negative torque to preload the engine. In other words, the electric machine 120 is operated to provide a negative torque while engine 110 is in speed control mode so that the engine load may be increased. By increasing the engine load the engine may be operated at a higher torque so that if the request to generate vehicle lateral slip is provided, a larger engine torque may be transferred to the vehicle's wheels in a shorter period of time. Increasing the engine load may cause engine boost pressure to increase, thereby reducing the possibility of turbocharger lag if a higher engine torque is requested.

Method 700 returns back to 706 after independently applying torque to the vehicle's front wheels. Alternatively, method 700 may exit if the vehicle driver applies the vehicle's brakes or provides another request for exiting drift mode. FIG. 4 shows a vehicle operating in this way.

In an alternative second method for operating the powertrain before the drift maneuver request is released, method 700 maintains the transmission with engaged clutches so that the engine 110 and electric machine 120 remain coupled to the vehicle's wheels. Further, electric machine 120 may be operated in a torque control mode to apply a negative torque to engine 110 and the driveline. The engine torque may be increased in response to the negative torque being applied by electric machine 120 so that torque requested by the vehicle driver is provided to the vehicle's wheels. For example, if the driver is requesting 50 Nm of positive torque at the transmission input shaft, engine 110 may provide 75 Nm of torque to the driveline and electric machine may apply −25 Nm of torque to the driveline so that 50 Nm of torque is provided at the transmission input shaft as is requested by the vehicle driver. In addition, if transmission 125 is a DTC transmission, then the DCT engages a lower number gear of a layshaft that is not presently transferring engine torque to the vehicle's wheels. For example, if transmission 125 is transferring torque through $4^{th}$ gear, the transmission may engage $3^{rd}$ gear or $1^{st}$ gear without transferring engine torque through $3^{rd}$ or $1^{st}$ gear. By engaging a lower gear, transmission 125 is prepared to provide a large torque increase to the vehicle's rear wheels.

In this way, vehicle operating conditions may be adjusted to improve initiation of lateral vehicle slip if lateral vehicle slip is requested. Further, torque supplied to the vehicle's rear wheels may be maintained to provide consistent drive feel.

At 708, method 700 judges if the desired yaw, yaw rate, and vehicle lateral slip have been achieved. In one example, method 700 receives vehicle yaw, yaw rate, and vehicle lateral slip amounts via the vehicle's inertia sensors. Method 700 may then compare the actual yaw, yaw rate, and vehicle lateral slip amounts with predetermined values stored in controller memory to determine whether the desired yaw, yaw rate, and vehicle lateral slip amounts have been achieved by the vehicle. If method 700 judges that the desired yaw, yaw rate, and vehicle lateral slip amounts have been achieved, the answer is yes and method 700 proceeds to 710. Otherwise, the answer is no and method 700 proceeds to 709.

At 709, method 700 quickly closes the transmission clutch to transfer engine torque to the rear wheels. Electric machine 120 changes from providing a negative torque to the driveline to providing a positive torque to the driveline and torque output by engine 110 may also be increased. By quickly closing the transmission clutch and increasing torque output by engine 110 and electric machine 120, the vehicle's rear wheels may overcome traction (e.g., a maximum amount of force a wheel may supply against the road) so that they may slip (e.g., when force applied to the wheel exceeds traction available to the wheel) and so that the vehicle may begin to slip laterally and yaw.

If the transmission is already transmitting torque through an engaged gear, the transmission may be shifted quickly to a lower gear (e.g., from $3^{rd}$ gear to $2^{nd}$ gear). Further, torque output from engine 110 and electric machine 120 may be increased. The quick shift and increase in torque act to induce wheel slip, induce yaw, and induce lateral vehicle slip.

Whether or not the transmission clutch is closed or the transmission is downshifted, torque continues to be supplied to the vehicle's front wheels. Further, the vehicle's rear differential may be locked before the transmission is downshifted or before the transmission's clutch is closed. Once the tire slip is initiated, the torque supplied by electric machine 120 may be increased or decreased to control engine speed, which is directly proportional to the tire slip speed, thereby increasing the driver's ability to control and maintain the vehicle in drifting conditions. Torque transferred through the differential 193 may be adjusted to control the amount of torque provided to each rear wheel. In one example, the differential may be adjusted so that additional torque is provided to the outside rear wheel to increase vehicle yaw, if desired. FIG. 5 shows an example of a vehicle operating in this way. Method 700 returns to 708.

At 710, method 700 judges if the vehicle drift maneuver is complete. In one example, method 700 may judge that the vehicle drift maneuver is complete if the vehicle driver releases the vehicle's accelerator pedal or reduces a driver demand torque to less than a threshold amount. Further, method 700 may judge that the vehicle driver maneuver is complete if the driver applies the vehicle brake pedal or if a GPS system indicates the vehicle is off a desired trajectory or if the vehicle has completed a desired route. If method 700 judges that the vehicle drift maneuver is complete, the answer is yes and method 700 proceeds to 712. Otherwise, the answer is no and method 700 proceeds to 711.

At 711, method 700 adjusts torque delivery between the vehicle's left wheels and the vehicle's right wheels. Further, method 700 adjusts torque delivery between the vehicle's front wheels and the vehicle's rear wheels. In one example, torque of engine 110, torque of electric machine 120, and torque of electric machines 135a and 135b is adjusted to provide the desired rear wheel slip, vehicle yaw, vehicle yaw rate, and lateral vehicle slip. In one example, the torque of each device is adjusted as a function of steering angle and vehicle speed. If the vehicle's driver returns the steering wheel angle to zero degrees, releases the accelerator pedal, applies the brake pedal, or causes other conditions to indicate that vehicle drift is no longer desired, then the drift maneuver may be determined to be complete at 710.

Several approaches may be applied to maintain the vehicle in the drift maneuver. In a first approach equal and opposite torques are applied to the vehicle's front wheels via electric machines 135a and 135b. For example, if the vehicle is turning to the right, then a regenerative torque may be applied to the front right wheel and a positive torque may be applied to the front left wheel. If this approach is applied, the vehicle controller may steer the vehicle by applying various levels of torque to the vehicle's front wheels. Torque of the engine 110 and electric machine 120 is adjusted to provide a desired amount of rear wheel slip.

In a second example, torque may be applied to both front wheels in only a single direction (e.g., a propulsive torque). However, in some examples, a negative torque may be applied to both front wheels. The magnitude of torque provided to the front right wheel may be different from the magnitude of torque provided to the front left wheel to control vehicle yaw and lateral movement. Torque applied to the front wheels may be compensated by torque applied to the rear wheels to maintain a desired vehicle acceleration rate. Alternatively, if the rear tires are slipping and provide a constant tractive force, then this method may be used as a way of controlling vehicle speed and acceleration without altering the slip speed or traction provided by the rear tires. Thus, torque of the engine 110 and electric machine 120 is adjusted to provide a desired amount of rear wheel slip in this method.

Method 700 may also provide a third approach where torque output from electric machines 135a and 135b is reduced to zero. As such, torque output from engine 110 and torque output from electric machine 120 may be adjusted to increase or decrease vehicle lateral slip and rear wheel slip.

FIG. 6 shows a vehicle operating according to step 711 while negotiating a right hand turn. Method 700 returns to 710.

At 712, method 700 reduces the vehicle yaw rate, rear wheel slip, and vehicle lateral slip via reducing an amount of torque supplied to the vehicle's rear wheels. In addition, torque difference between the vehicle's front wheels may be reduced to reduce vehicle yaw and vehicle lateral slip. Likewise, the torque difference between the vehicle's rear wheels may be reduced to reduce vehicle yaw and vehicle lateral slip. Method 700 proceeds to exit.

In this way, a vehicle may enter into a drifting mode and it may be controlled to stay in the drift mode as long as the vehicle's driver requests. Further, the vehicle may automatically exit the drift mode and return to the baseline powertrain operating mode to increase vehicle stability.

Thus, the method of FIG. 7 may provide for a vehicle operating method, comprising: receiving a vehicle drift maneuver request via a controller; and opening one or more clutches of a transmission, providing a propulsive torque to a first front wheel of a vehicle, and providing a regenerative braking torque to a second front wheel via the controller in response to the vehicle drift maneuver request. The method includes where the first front wheel is an outside front wheel, and where the second front wheel is an inside front wheel. The method further comprises operating an engine in a speed control mode and adjusting a speed of an engine to a desired speed in response to the vehicle drift maneuver request. The method further comprises operating an integrated starter generator in a torque control mode in response to the vehicle drift maneuver request. The method includes where the integrated starter generator is commanded to a negative torque that causes the engine to operate with a boost pressure that is greater than a threshold boost pressure. The method includes where the one or more clutches include first and second clutches of a dual clutch transmission. The method includes where the transmission is an automatically shifted manual transmission.

The method of FIG. 7 also provides for a vehicle operating method, comprising: receiving a vehicle drift maneuver request via a controller; opening one or more clutches of a transmission, providing a propulsive torque to a first front wheel of a vehicle, and providing a regenerative braking torque to a second front wheel via the controller in response to the vehicle drift mode request; receiving a request to generate vehicle lateral slip; and closing the one or more clutches and adjusting engine torque and electric machine torque to provide a desired amount of vehicle lateral slip and a desired amount of rear wheel slip in response to the request to generate vehicle lateral slip. The method further comprises engaging a second transmission gear while the one or more clutches are open in response to the vehicle drift maneuver request. The method includes where the second transmission gear is a lower gear than a first transmission gear, and where the first transmission gear is engaged when the vehicle drift maneuver request is received. The method further comprises operating the vehicle at the desired amount of vehicle lateral slip; and continuing to provide the propulsive torque to the first front wheel and providing propulsive torque to the second front wheel in response to operating the vehicle at the desired amount of vehicle lateral slip. The method further comprises activating a vehicle drift mode before receiving the vehicle drift maneuver request. The method further comprises exiting the vehicle drift mode in response to a vehicle driver applying a brake or fully releasing an accelerator pedal. The method includes where exiting the vehicle drift mode includes reducing the desired amount of vehicle lateral slip and the desired amount of rear wheel slip.

Referring now to FIG. 8A, a schematic showing vehicle 121 operating with a steering angle of zero degrees is shown. Longitudinal axis 800 of vehicle 121 is shown bisecting vehicle 121 for the length of vehicle 121. Each of wheels 130a and 130b include longitudinal axis that are parallel with vehicle longitudinal axis 800. The longitudinal axis 802 of wheels 130a and 130b turn as wheels 130a and 130b turn. The angle between the wheel longitudinal axis 802 and the vehicle longitudinal axis 800 is the steering angle. In this example, the steering angle is zero since wheel longitudinal axis 802 is parallel with vehicle longitudinal axis 800. Vehicle 121 travels in a straight path when the wheel longitudinal axis 802 is in parallel with the vehicle longitudinal axis 800.

Figure 8B:
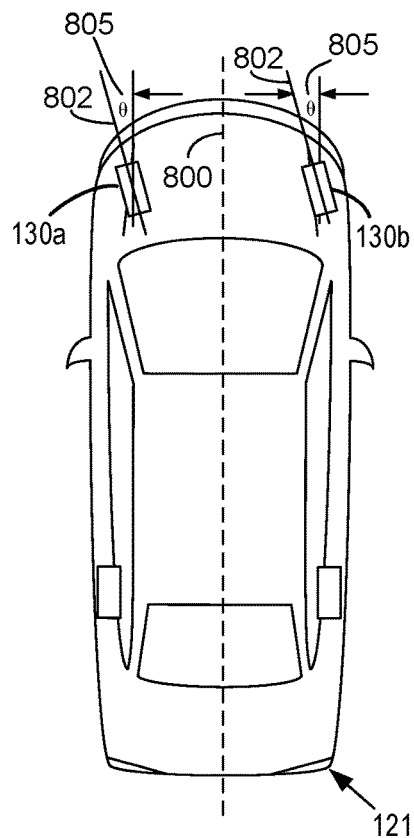
Figure 9:
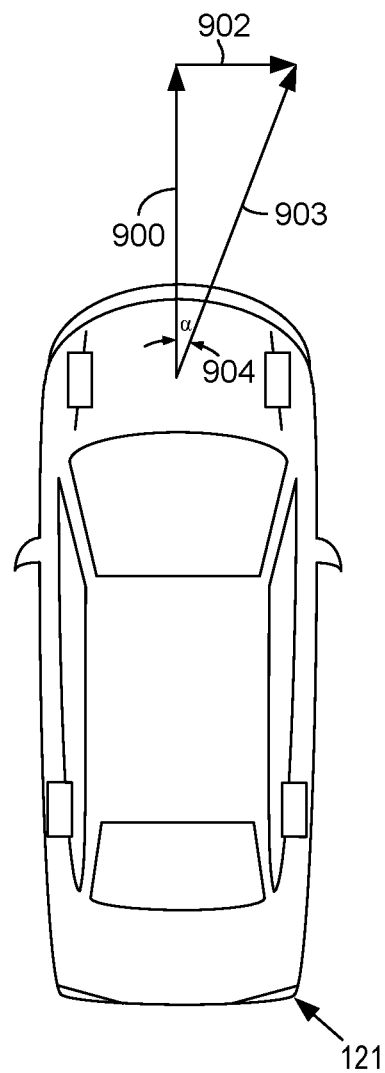
FIG. 9 shows a lateral slip force of a vehicle.

Referring now to FIG. 8B, a schematic showing vehicle 121 operating with a steering angle of ⊖ degrees is shown. As shown in FIG. 8A, longitudinal axis 800 of vehicle 121 is shown bisecting vehicle 121 for the length of vehicle 121. Wheel longitudinal axis 802 for each of wheels 130a and 130b are not parallel with vehicle longitudinal axis 800. Rather, wheel longitudinal axes 802 are oriented at an angle ⊖ from vehicle longitudinal axis 800. The angle ⊖ is shown at 805 for each of left front wheel 130a and right front wheel 130b. The angle ⊖ between the wheel longitudinal axis 802 and the vehicle longitudinal axis 800 is the steering angle. The angle between where wheel axis 802 is parallel with vehicle longitudinal axis 800 and the wheel axis 802 when wheels 130a and 130b are turned may also be referred to as the steering angle.

Referring now to FIG. 9, a figure illustrating vehicle lateral slip angle α is shown. Vehicle 121 is shown with a forward velocity vector 900 that shows the direction that vehicle 121 is pointing. Vehicle 121 is also shown with a lateral velocity vector 902. The vehicle slip angle is the angle 904 between the vehicle's actual direction 903 (e.g., the sum of the forward velocity vector 900 and the lateral velocity vector 902) and the direction that the vehicle is pointing (e.g., the same direction as the forward velocity vector 900).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
receiving a vehicle drift maneuver request via a controller;
opening one or more clutches of a transmission, providing a propulsive torque to a first front outside wheel of a vehicle, and providing a regenerative braking torque to a second front inside wheel via the controller in response to the vehicle drift maneuver request; and
operating an engine in a speed control mode and adjusting a speed of the engine to a desired speed in response to the vehicle drift maneuver request, where in the speed control mode, engine speed is controlled to the desired speed with engine torque adjusted so that engine speed follows the desired speed.

2. The method of claim 1, further comprising:
operating an integrated starter generator in a torque control mode in response to the vehicle drift maneuver request.

3. The method of claim 1, where the integrated starter generator is commanded to a negative torque that causes the engine to operate with a boost pressure that is greater than a threshold boost pressure.

4. The method of claim 1, where the one or more clutches include first and second clutches of a dual clutch transmission.

5. The method of claim 1, where the transmission is an automatically shifted manual transmission.

6. A vehicle operating method, comprising:
receiving a vehicle drift maneuver request via a controller;
opening one or more clutches of a transmission, providing a propulsive torque to a first front wheel of a vehicle, and providing a regenerative braking torque to a second front wheel via the controller in response to the vehicle drift maneuver request;
receiving a request to generate vehicle lateral slip; and
closing the one or more clutches and adjusting engine torque and electric machine torque to provide a desired amount of vehicle lateral slip and a desired amount of rear wheel slip in response to the request to generate vehicle lateral slip.

7. The method of claim 6, further comprising engaging a second transmission gear while the one or more clutches are open in response to the vehicle drift maneuver request.

8. The method of claim 7, where the second transmission gear is a lower gear than a first transmission gear, and where the first transmission gear is engaged when the vehicle drift maneuver request is received.

9. The method of claim 6, further comprising:
operating the vehicle at the desired amount of vehicle lateral slip; and
continuing to provide the propulsive torque to the first front wheel and providing the propulsive torque to the second front wheel in response to operating the vehicle at the desired amount of vehicle lateral slip.

10. The method of claim 6, further comprising activating a vehicle drift mode before receiving the vehicle drift maneuver request.

11. The method of claim 10, further comprising exiting the vehicle drift mode in response to a vehicle driver applying a brake or fully releasing an accelerator pedal.

12. The method of claim 11, where exiting the vehicle drift mode includes reducing the desired amount of vehicle lateral slip and the desired amount of rear wheel slip.

13. A vehicle system, comprising:
a vehicle powertrain including an engine coupled to a first electric machine and a transmission coupled to the first electric machine;
a second electric machine coupled to a first front wheel and a third electric machine coupled to a second front wheel;
a human/machine interface; and
a controller including executable instructions stored in non-transitory memory to receive a vehicle drift maneuver request via the human/machine interface and provide a negative torque via the first electric machine and a positive torque via the engine in response to the vehicle drift maneuver request.

14. The vehicle system of claim 13, further comprising additional instructions to increase boost provided via a turbocharger coupled to the engine in response to the vehicle drift maneuver request.

15. The vehicle system of claim 14, further comprising additional instructions to provide a same powertrain torque as a function of accelerator pedal position before receiving the vehicle drift maneuver request as after receiving the vehicle drift maneuver request.

16. The vehicle system of claim 14, where a first gear of the transmission is engaged when the vehicle drive maneuver request is received, and further comprising:
additional instructions to engage a second gear of the transmission in response to receiving the vehicle drift maneuver request, and where the second gear is a lower gear than the first gear.

17. The vehicle system of claim 16, further comprising additional instructions to receive a request to generate vehicle lateral slip via the human/machine interface and deliver engine torque to vehicle wheels via the second gear in response to the request to generate vehicle lateral slip.

18. The vehicle system of claim 13, further comprising additional instructions to adjust engine torque and electric machine torque in response to vehicle speed.

* * * * *